United States Patent
Tajima et al.

(10) Patent No.: US 7,099,742 B2
(45) Date of Patent: Aug. 29, 2006

(54) DEVICE FOR CONTROLLING ROBOT BEHAVIOR AND METHOD FOR CONTROLLING IT

(75) Inventors: Shigeru Tajima, Kanagawa (JP); Junichi Rekimoto, Kanagawa (JP); Yuji Ayatsuka, Tokyo (JP); Nobuyuki Matsushita, Tokyo (JP); Tota Hasegawa, Tokyo (JP); Hidenori Karasawa, Tokyo (JP); Eduardo A. Sciammarella, Tokyo (JP)

(73) Assignee: Sony Corporation, Tokyo (JP)

(*) Notice: Subject to any disclaimer, the term of this patent is extended or adjusted under 35 U.S.C. 154(b) by 245 days.

(21) Appl. No.: 10/168,225

(22) PCT Filed: Oct. 19, 2001

(86) PCT No.: PCT/JP01/09215

§ 371 (c)(1),
(2), (4) Date: Oct. 17, 2002

(87) PCT Pub. No.: WO02/32630

PCT Pub. Date: Apr. 25, 2002

(65) Prior Publication Data
US 2003/0109959 A1   Jun. 12, 2003

(30) Foreign Application Priority Data
Oct. 20, 2000   (JP)   ............................ 2000-321284

(51) Int. Cl.
*G06F 19/00*   (2006.01)

(52) U.S. Cl. .............. 700/245; 700/246; 700/247; 700/248; 700/249; 700/250; 700/258; 700/262; 318/568.1; 901/46; 901/47

(58) Field of Classification Search ................ 700/245, 700/246, 247, 248, 249, 250, 253, 257, 258, 700/262, 275; 318/568.1; 901/46, 47
See application file for complete search history.

(56) References Cited

U.S. PATENT DOCUMENTS 6,321,140 B1 * 11/2001 Fujita et al. ................. 700/248
6,381,515 B1 *  4/2002 Inoue et al. ................. 700/245

(Continued)

FOREIGN PATENT DOCUMENTS

JP   7-170215   7/1995

(Continued)

OTHER PUBLICATIONS

Breazeal et al., Infant-like Social Interaction between a Robot and a Human Caregiver, 1998, Internet, pp. 1-57.*

*Primary Examiner*—Thomas G. Black
*Assistant Examiner*—McDieunel Marc
(74) *Attorney, Agent, or Firm*—Frommer Lawrence & Haug LLP; William S. Frommer

(57) ABSTRACT

An apparatus that controls the action of a pet robot. The apparatus includes a portable terminal (3) having an electrode that may contact a user (2). When the user touches the electrode provided on the head of the robot (1), the user ID stored in the memory section of the portable terminal (3) is transmitted to the robot (1) through the user (2). The robot (1) retrieves the information associated with the user ID it has received, thereby identifying the user (2). The robot (1) may determine that the user (2) touched it in the past. In this case, the robot (1) performs an action in accordance with the information about what the user (2) did to it in the past.

21 Claims, 15 Drawing Sheets

U.S. PATENT DOCUMENTS

| | | | |
|---|---|---|---|
| 6,415,203 B1 * | 7/2002 | Inoue et al. | 700/245 |
| 6,438,457 B1 * | 8/2002 | Yokoo et al. | 700/245 |
| 6,470,235 B1 * | 10/2002 | Kasuga et al. | 700/246 |
| 6,470,237 B1 * | 10/2002 | Fujita et al. | 700/248 |
| 6,505,098 B1 * | 1/2003 | Sakamoto et al. | 700/245 |
| 6,512,965 B1 * | 1/2003 | Osawa | 700/245 |
| 6,519,506 B1 * | 2/2003 | Osawa | 700/245 |
| 6,539,283 B1 * | 3/2003 | Takagi | 700/245 |
| 6,542,788 B1 * | 4/2003 | Hosonuma et al. | 700/245 |
| 6,560,511 B1 * | 5/2003 | Yokoo et al. | 700/245 |
| 6,567,724 B1 * | 5/2003 | Yamamoto | 700/261 |
| 6,587,751 B1 * | 7/2003 | Takamura et al. | 700/245 |
| 6,650,965 B1 * | 11/2003 | Takagi et al. | 700/245 |
| 6,684,127 B1 * | 1/2004 | Fujita et al. | 700/245 |
| 6,708,081 B1 * | 3/2004 | Yoshida | 700/245 |
| 6,711,469 B1 * | 3/2004 | Sakamoto et al. | 700/245 |
| 6,718,232 B1 * | 4/2004 | Fujita et al. | 700/245 |
| 6,728,598 B1 * | 4/2004 | Fujita et al. | 700/245 |
| 6,754,472 B1 * | 6/2004 | Williams et al. | 455/100 |
| 6,816,753 B1 * | 11/2004 | Sakamoto et al. | 700/249 |
| 2003/0050649 A1 * | 3/2003 | Brock et al. | 606/130 |

FOREIGN PATENT DOCUMENTS

| | | |
|---|---|---|
| JP | 8-202679 | 8/1996 |
| JP | 10-103923 | 4/1998 |
| JP | 11-262061 | 9/1999 |
| JP | 11-282533 | 10/1999 |

* cited by examiner

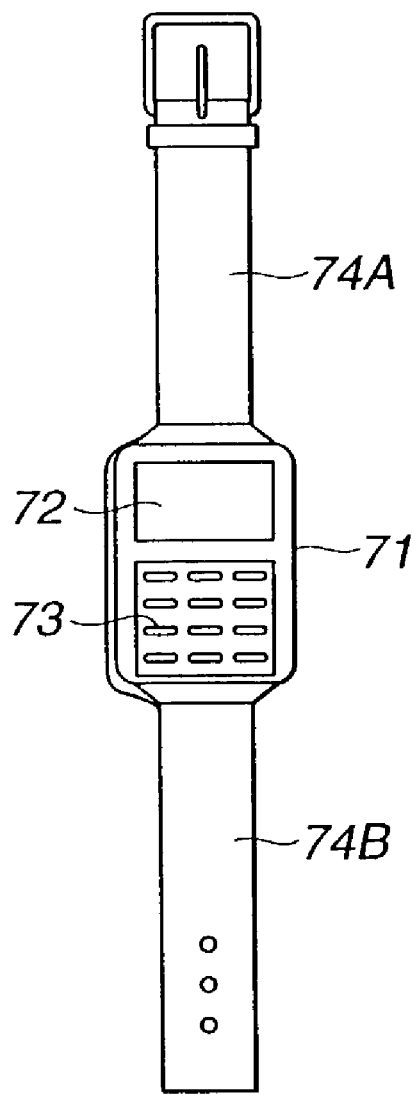
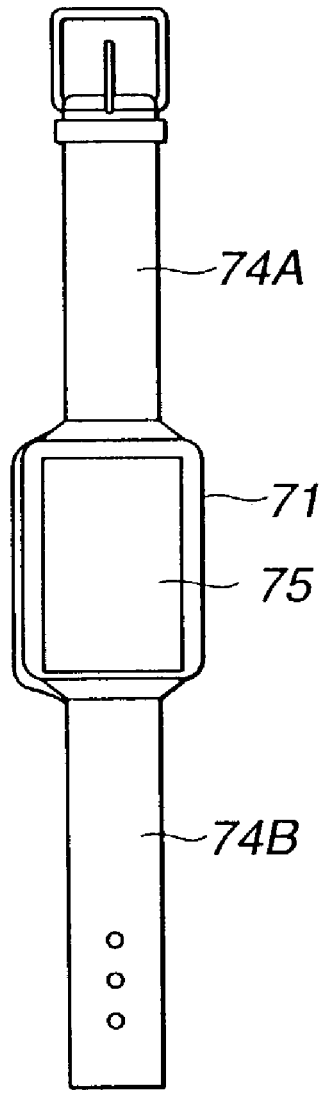
FIG.7A　　　　FIG.7B

DEVICE FOR CONTROLLING ROBOT BEHAVIOR AND METHOD FOR CONTROLLING IT

TECHNICAL FIELD

The present invention relates to an apparatus for controlling the actions of a robot and a method of controlling the same. Further, the invention relates a system for controlling the actions of a robot, an apparatus for controlling the system, and a recording medium storing the program for operating the system. More particularly, the invention relates to an apparatus and method for controlling a pet robot, causing the same to perform various actions and to a system for controlling a robot.

BACKGROUND ART

Pet robots (e.g., AIBO (trademark)) have been commercialized for entertainment use and other uses. They can take various actions when users call them or touch them.

A robot of this type has sensors that detect the user's voice, the user's motion, and other stimuli. The robot stores a program that makes it "grow" to be a pet having specific character, in accordance with the stimuli it received in the past. The robot will grow to be friendly with people if the user often plays with it. If the user does not play with the robot so often, the robot will grow to be fond of playing by itself.

It is desired that growth patterns, as many and as complex as possible, be prepared for such an entertainment robot. For example, a robot friendly with people may be programmed to change it attitude to some degree, from person to person who contacts with it. In this case, the robot will be lovelier to its user.

DISCLOSURE OF THE INVENTION

The present invention has been made in view of the foregoing. An object of the invention is to provide an apparatus for causing a pet robot or the like to take various actions.

To achieve the object, an action control apparatus according to the present invention comprises: transmitting means for transmitting control data which controls the actions of a pet robot; and transfer means for contacting an electrically conductive member of the pet robot through a transfer medium, thereby to transfer to the pet robot the control data transmitted by the transmitting means. The transfer medium may be a human being.

The action control apparatus according to the invention may be located at a prescribed position within an area where the pet robot walks and move around. The transmitting means transmits control data related to the position at which the action control apparatus is located. The action control apparatus is configured to be mounted on an arm of the human being.

The action control apparatus according to the invention may further comprises input means for inputting the control data, memory means for storing the control data input from the input means, and display means for displaying the control data stored in the memory means.

In this case, the control data includes dynamic data items and static data items concerning a user.

The action control apparatus according to the invention may further comprise receiving means that receives predetermined information transmitted from the pet robot.

According to this invention there is provided a method of controlling an action control apparatus for controlling the actions of a pet robot. The method comprises: a step of transmitting control data which controls the actions of the pet robot; and a step of contacting an electrically conductive member of the pet robot through a transfer medium, thereby to transfer to the pet robot the control data transmitted by the transmitting means.

According to the invention there is provided a recording medium that stores a computer-readable program for controlling an action control apparatus for controlling the actions of a pet robot. The program describes: a step of transmitting control data which controls the actions of the pet robot; and a step of contacting an electrically conductive member of the pet robot through a transfer medium, thereby to transfer to the pet robot the control data transmitted by the transmitting means.

A pet robot according to the present invention comprises: receiving means for receiving control data from an external device; action data acquiring means for acquiring action data corresponding to the control data received by the receiving means; and action control means for controlling actions in accordance with the action data acquired by the action data acquiring means. The receiving means has an electrically conductive member exposed to outside to contact another body and is configured to receive the control data through the electrically conductive member.

The pet robot according to the invention further comprises memory means for storing the action data which has been acquired by the action data acquiring means and which the action control means uses to control the actions.

In the pet robot of the invention, a plurality of electrically conductive members of the type described are provided, and the action control means controls the actions in accordance with which electrically conductive member has received the control data.

The pet robot of the invention further comprises detecting means for detecting a pressure that the other body applies to the electrically conductive member when contacting the member. The action data acquiring means acquires action data corresponding to the pressure detected by the detecting means.

A pet robot according to this invention may further comprise: communication means for communicating with a data processing apparatus connected to a network, by way of the electrically conductive member; program acquiring means for acquiring a control program for the action control means, from the network as the communication means performs communication; and updating means for updating the control program for the action control means, in accordance with the control program acquired by the program acquiring means.

This pet robot according to the invention may further comprise a data processing apparatus located at a prescribed position within an area where the pet robot walks and moves around and communication means for communicating with the data processing apparatus through the electrically conductive member, and in which the receiving means receives, from the data processing apparatus, control data corresponding to the position of the data processing apparatus.

A method of controlling an autonomous pet robot, according to the present invention, comprises: a step of receiving control data transmitted from an external device; a step of acquiring action data corresponding to the control data received at the step of receiving control data; and a step of controlling actions in accordance with the action data acquired in the step of acquiring action data. In the method, at the step of receiving control data, the control data is received through an electrically conductive member exposed to outside to contact another body.

A recording medium according to this invention records a program for controlling an autonomous pet robot. The program describes: a step of receiving control data transmitted from an external device; a step of acquiring action data corresponding to the control data received at the step of receiving control data; and a step of controlling actions in accordance with the action data acquired in the step of acquiring action data. Thus, at the step of receiving control data, the control data s received through an electrically conductive member exposed to outside to contact another body.

A robot control system according to the present invention comprises an autonomous pet robot and an action control apparatus for controlling actions of the pet robot. The action control apparatus comprises transmitting means for transmitting control data for controlling the pet robot and transfer means for contacting an electrically conductive member of the pet robot through a transfer medium, thereby to transfer to the pet robot the control data transmitted by the transmitting means. The pet robot comprises receiving means for receiving the control data transmitted from the action control apparatus, action data acquiring means for acquiring action data corresponding to the control data received by the receiving means, and action control means for controlling actions in accordance with the action data acquired by the action data acquiring means. The receiving means has an electrically conductive member exposed to outside to contact another body and is configured to receive the control data through the electrically conductive member.

In the present invention, control data is transmitted to a pet robot to control the actions of the pet robot, through an electrically conductive member provided on the robot and a transfer medium. In the invention, the control data may be transmitted to the pet robot from an external apparatus, action data corresponding to the control data is acquired, and the pet robot is controlled in accordance with the action data acquired. The section for receiving the control data has an electrically conductive member exposed to outside to contact another body and is configured to contact another body. The control data is received through the electrically conductive member. Further, in the invention, control data for to controlling the actions of the pet robot is transmitted to a pet robot through an electrically conductive member provided on the robot and a transfer medium.

In the present invention, the robot receives the control data from an action control apparatus, the action data corresponding to the control data received is acquired, and the pet robot is controlled in accordance with the action data acquired. The section for receiving the control data has an electrically conductive member exposed to outside to contact another body and is configured to contact a transfer medium. The control data is received through the electrically conductive member.

Other objects of the invention and the specific advantages achieved by the invention will be more apparent from the following description of the embodiments.

BRIEF DESCRIPTION OF THE DRAWINGS

FIGS. 7A and 7B depict the outer appearance of a portable terminal according to this invention;

BEST MODE FOR CARRYING OUT THE INVENTION

Embodiments of the invention will be described, with reference to the accompanying drawings.

Figure 1:
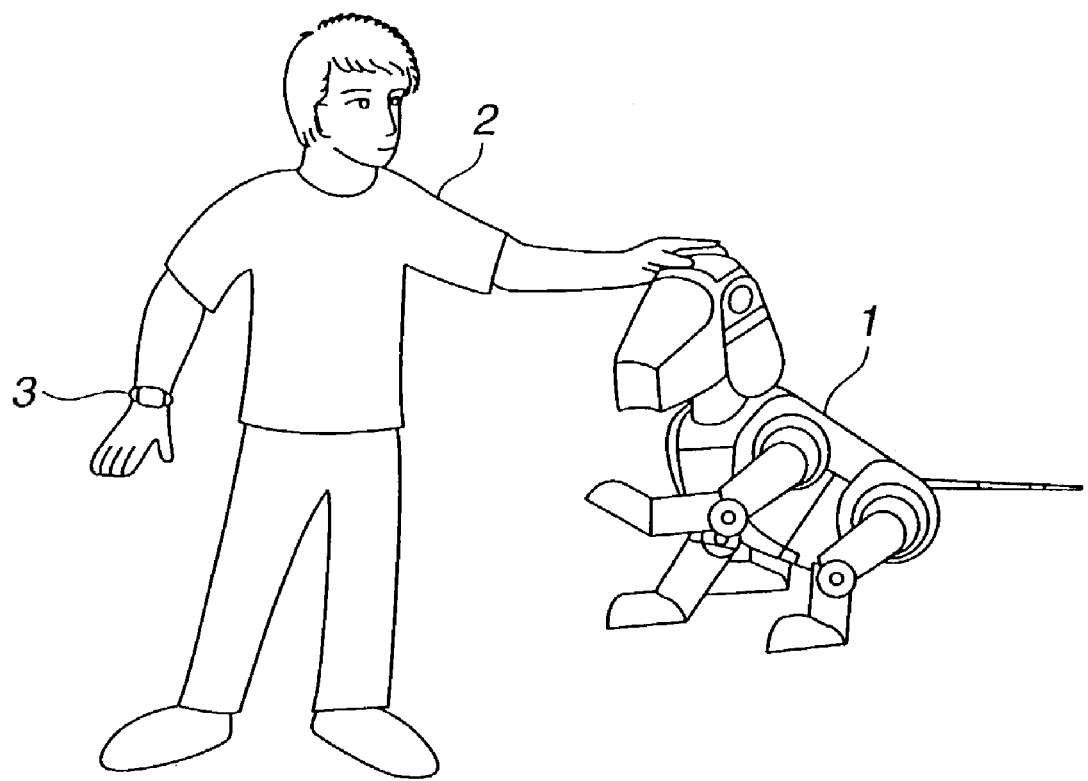
FIG. 1 shows the structure of a robot control system according to the present invention.

A robot control system according to this invention has the structure illustrated in FIG. 1. In the robot control system, a pet robot 1 (hereinafter referred to as "robot") can identify the user 2 who touches it.

The user 2 wears a portable terminal 3 on the right wrist. The terminal 3 is shaped like a wristwatch. When the user 2 touches the electrically conductive electrode 15 provided on the head of the robot 1, the user ID stored in the portable terminal 3 is supplied via the user 2 (human body) to the robot 1. The robot 1 checks the user ID against the user IDs registered in it, thus identifying the user 2. That is, the portable terminal 3 has an electrode 75 (see FIG. 8, later described) made of electrically conductive material and contacting the user 2. As long as the user 2 wears the portable terminal 3 and touches the pet 1, the terminal 3 repeatedly supplies the user ID to the robot 1 via the user 2.

When the robot 1 identifies the user 2, it acquires the data about the past, which corresponds to the user ID. The robot 1 performs an action in accordance with the data. For example, it wags its tail or does a similar action, showing its friendliness to the user 2, if the user 2 often stroked it in the past. If robot 2 was beaten by the user 2 in the past, it looks the other way or takes a similar action. Thus, the robot 1 can perform different actions to different persons.

In the system of FIG. 1, the portable terminal 3 is shaped like a wristwatch. The terminal 3 may have any other shape, nonetheless, provided that it can contact the user 2. It may be provided in the form of, for example, an accessory such as a necklace or a ring, a PDA (Personal Digital Assistant), a mobile telephone, or the like.

Figure 2:
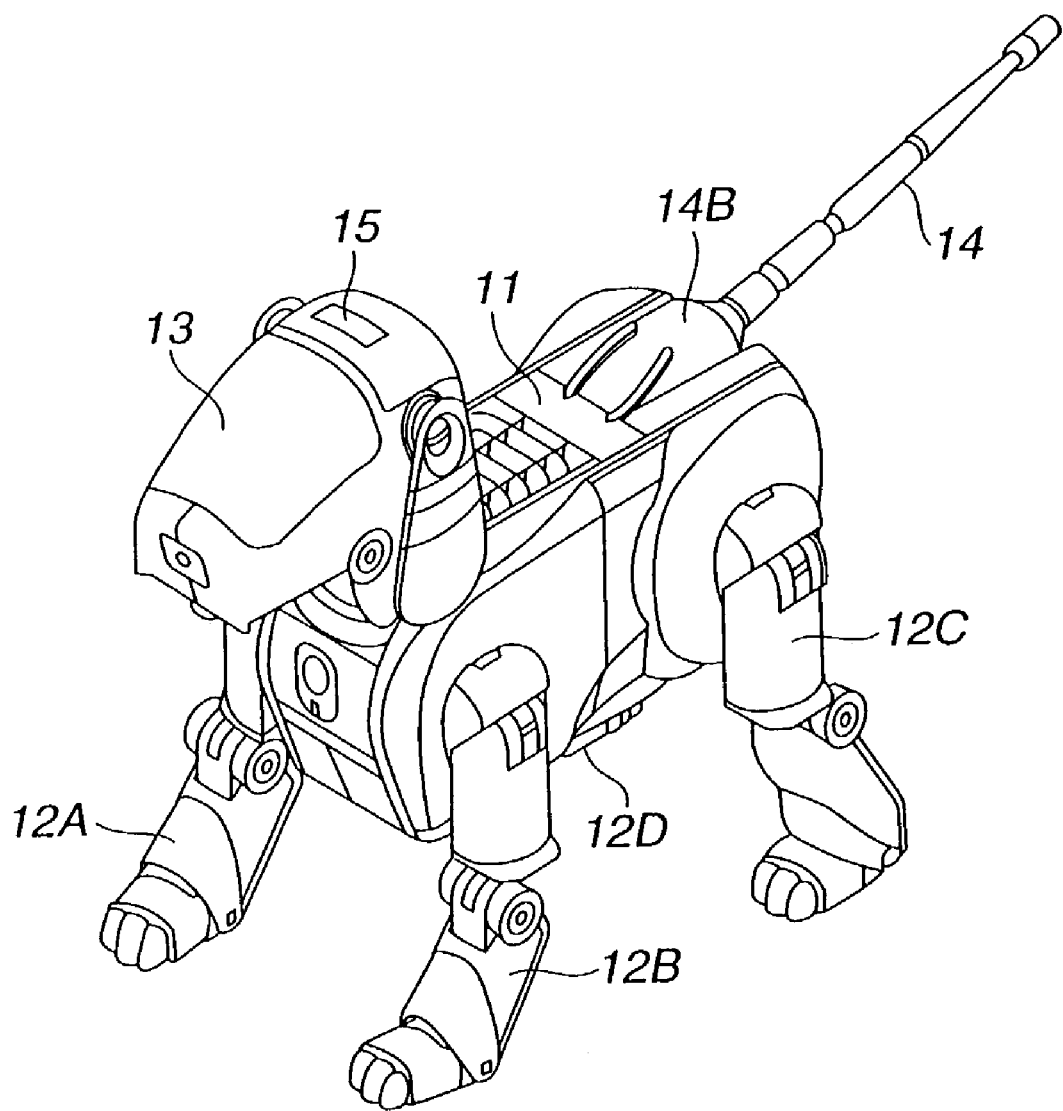
FIG. 2 is a perspective view of the robot shown in FIG. 1.
Figure 3:
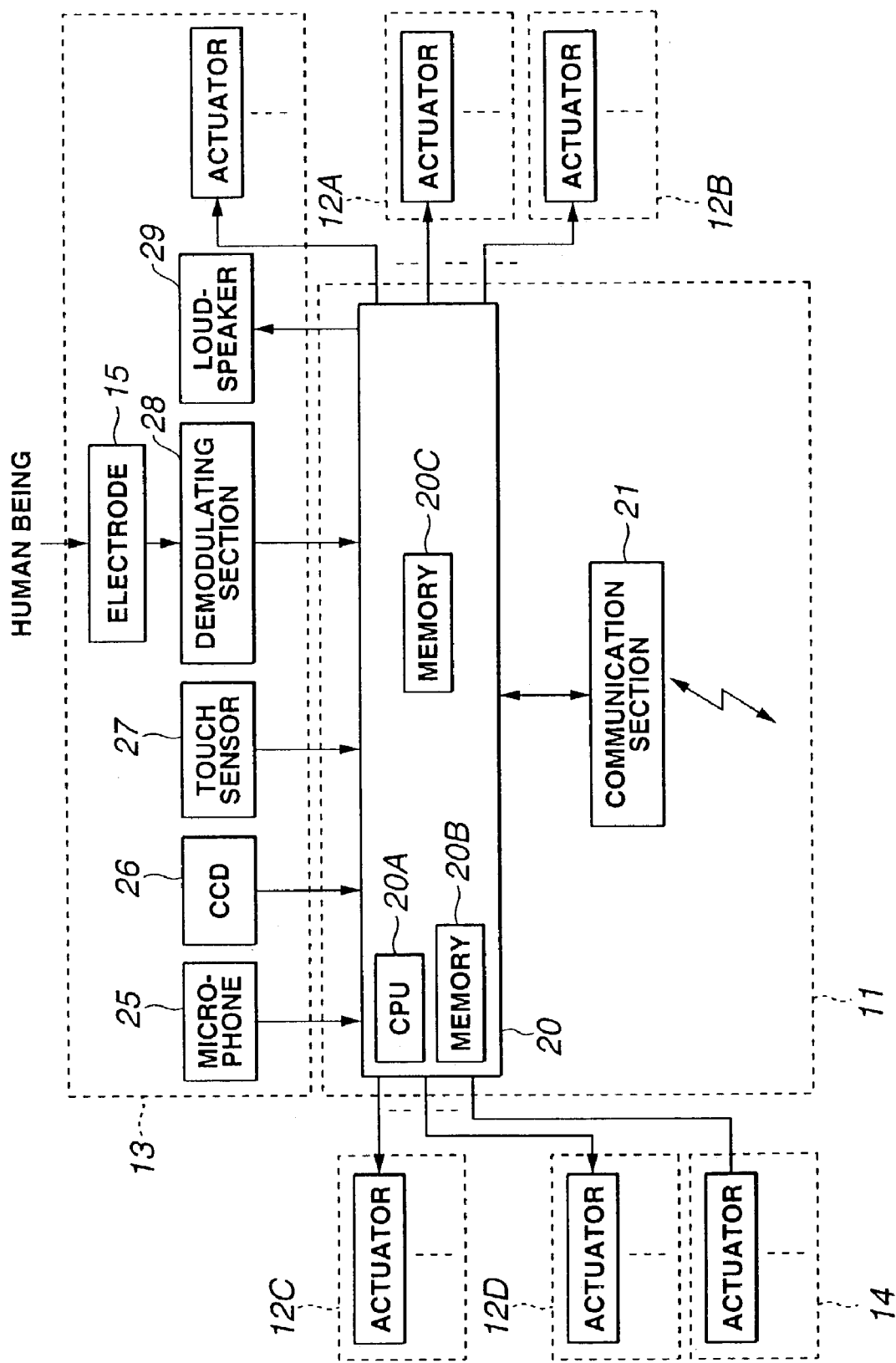
FIG. 3 is a block diagram showing the internal configuration of the robot shown in FIG. 1.

FIG. 2 shows the outer appearance of the robot 1 according to the invention, and FIG. 3 is a block diagram depicting the internal configuration of the robot 1.

The robot 1 according to this invention is shaped like a dog, a four-legged animal, and has a trunk unit 11. Leg units 12A and 12B are coupled to the front part of the trunk unit 11. Leg units 12C and 12D to the rear part of the trunk unit 11. The head unit 13 and the tail unit 14 are coupled to the front end and rear end of the trunk unit 11, respectively. The head unit 13 has an electrode 15 made of electrically conductive material, exposed outside and positioned to be touched by the user 2. The tail unit 14 extends from the base section 14B located on the upper surface of the rear part of the trunk unit 11. The tail section 14 can bent and swing.

As FIG. 3 shows, the trunk unit 11 contains a controller 20. The controller 20 comprises a CPU (Central Processing Unit) 20A, a memory 20B, and a memory 20C. The CPU 20A controls the other components of the controller 20. The memory 20B stores the program the CPU 20A executes to control the other components of the controller 20. The memory 20C stores the user IDs registered in the past, the data representing the actions the robot 1 received from the users identified by the user IDs, and the data representing the personality of each user.

The trunk unit 11 incorporates a communications section 21. The communications section 21 controls radio communication or cable communication. This makes it possible to install the latest version of the program into the memory 20B of the controller 20, in place of the old-version program. If the communications section 21 carries out radio communication, the tail unit 14 can be used as antenna.

The trunk unit 11 incorporates a battery and the like, in addition to the communications section 21. The battery (not shown) functions as the power supply of the robot 1.

The head unit 13 has a loudspeaker 29 at a prescribed position. The loudspeaker 29 functions as "mouth" of the robot 1. The head unit 13 has a microphone 25, a CCD (Charge Coupled Device) camera 26, and a touch sensor 27, too, which are arranged at predetermined positions. The microphone 25, CCD camera 26 and touch sensor 27 are sensors that detect stimuli applied to the robot 1 from outside. Namely, the microphone 25 serves as "ears" to detect sound; the CCD camera 26 functions as "eyes" to detect light; and the touch sensor 27 works as a touch-sensing organ to detect pressure or the like.

When the user 2 wearing the portable terminal 3 touches the electrode 15 provided on the head unit 13, the electrode 15 receives the user ID of the user 2 via the user 2. The user ID received at the electrode 15 is supplied to a demodulating section 28. The section 28 demodulates the user ID, which is transferred to the controller 20.

Actuators are provided at the joints of each of the leg units 12A to 12D. An actuator is provided at the joint between each leg unit and the trunk unit 11. Two actuators are provided, respectively, at the joint between the trunk unit 11 and the head unit 13 and the joint between the trunk unit 11 and the tail unit 14. All the actuators move the parts of the robot body in accordance with the instructions supplied from the controller 20.

The microphone 25, which is arranged on the head unit 13, detects the ambient sound including the speech the user 2 utters. The microphone 25 converts the sound into an audio signal, which is output to the controller 20. The CCD camera 26 photographs the surrounding scenery and generates an image signal representing the scenery. The image signal is supplied to the controller 20. The touch sensor 27 is arranged, for example, atop the head unit 13. It detects the pressure applied to the head unit 13 as the user performs a physical action such as "stroking" or "beating" on the head unit 13. The sensor 27 converts the pressure into a pressure signal, which is supplied to the controller 20.

The controller 20 determines the ambient conditions of the robot 1 and whether the robot 2 has received the user's instructions, from the audio signal, image signal and pressure signal it has received from the microphone 25, CCD camera 26 and touch sensor 27. The controller 20 determines what action the robot 1 should take next, from the ambient conditions and the instructions and from the data about the user 2 identified by the user ID supplied to the electrode 15. To make the robot 1 take this action, the controller 20 drives the actuators, shaking the head unit 11 sideways or up and down, moving the tail unit 14, or driving the leg units 12A to 12D to make the robot 1 walk. If necessary, the controller 20 generates synthesized sound, supplies the sound to the loudspeaker 29 and causes the loudspeaker 29 to output the sound. Further, the controller 20 may turn on, turn off or repeatedly turn on the LEDs (Light Emitting Diodes) (not shown) that are provided at the eye positions of the robot 1.

Thus, the robot 1 autonomously acts in accordance with the environmental conditions and in response to the action of the user 2.

Figure 4:
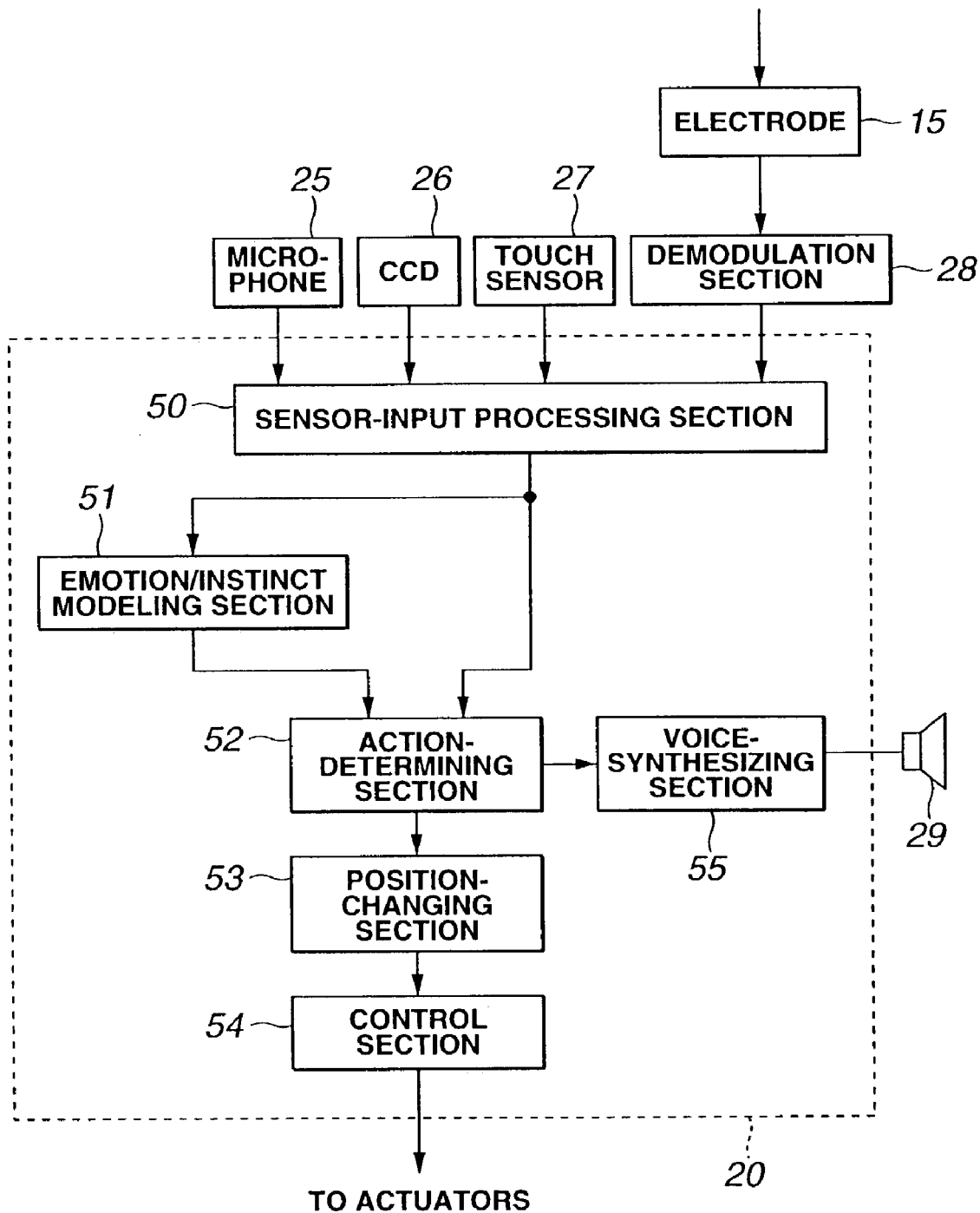
FIG. 4 is a block diagram illustrating the functions of the CPU incorporated in an apparatus for controlling the actions of the robot.

FIG. 4 shows the function blocks incorporated in the controller 20 illustrated in FIG. 3. The function blocks shown in FIG. 4 are implemented when the CPU 20A executes the control program stored in the memory 20B. The controller 20 comprises a sensor-input processing section 50, an emotion/instinct modeling section 51, an action-determining section 52, a position-changing section 53, a control section 54, and a voice-synthesizing section 55. The sensor-input processing section 50 receives the outputs of the microphone 25, CCD camera 26 and touch sensor 27, which are sensors that have detected the external stimuli. The section 50 processes the outputs to recognize the environmental conditions of the robot 1 and the like. The emotion/instinct modeling section 51 accumulates the data representing the environmental conditions that the section 50 has recognized and generates data representing the motion and instinct. The action-determining section 52 determines what action the robot 1 should take, from the data generated by the sensor-input processing section 50. The position-changing section 53 causes the robot 1 to perform the action determined by the action-determining section 52. The control section 54 drives and controls the actuators. The voice-synthesizing section 55 generates synthesized sound.

The sensor-input processing section 50 receives a speech signal from the microphone 25, an image signal from the CCD camera 26, and a pressure signal from the touch sensor 27. From these signals the section 50 determines the environmental conditions, the particular action of the user 2, the instructions of the user 2, and the like. The section 50 generates data showing what it has determined and supplies the data to the emotion/instinct modeling section 51 and the action-determining section 52.

That is, the sensor-input processing section 50 recognizes the speech from the speech signal supplied from the microphone 25. The section 50 generates an instruction from the speech recognized, which is, for example, "walk," "stay" or "run after the ball." The section 50 supplies the instruction and any other meaningful information to the action-determining section 52.

The sensor-input processing section 50 performs image recognition by using the image signal supplied from the CCD camera 26. If the section 50 may detect, for example, a "red, round object," a "wall perpendicular to the ground and having a height greater than a prescribed value" or the like. In this case, the section 50 generates image-recognition data representing the existence of a ball, a wall, or the like. This data is supplied to the emotion/instinct modeling section 51 and the action-determining section 52.

The sensor-input processing section 50 processes the pressure signal supplied from the touch sensor 27. If the pressure signal represents a pressure equal to or higher than a prescribed value and applied for a short time, the sensor-input processing section 50 determines that the robot 1 has been beaten (or scolded). If the pressure signal represents a pressure lower than the prescribed value and applied for a long time, the section 50 determines that the robot 1 has been stroked (or praised). The section 50 generates the data representing the action to the robot 1 and supplies it as meaningful information to the emotion/instinct modeling section 51 and the action-determining section 52. The robot 1 can therefore change its action in accordance with the pressure detected.

The sensor-input processing section 50 processes the user ID supplied from the portable terminal 3 the user 2 wears. The user ID has been modulated to propagate efficiently through the user 2. The demodulating section 28 therefore demodulates the user ID, which is supplied to the sensor-input processing section 50.

The sensor-input processing section 50 receives the user IDs registered in the past and stored in the memory 20C. The section 50 retrieve the user ID identical to the user ID supplied from the portable terminal 3. From the user ID it has retrieved, the sensor-input processing section 50 determines whether the user 2 is one who has played with it. The section 50 generates data showing whether the user 2 has placed with the robot 1, as meaningful information, to the emotion/instinct modeling section 51 and the action-determining section 52.

If the sensor-input processing section 50 determines that the user 2 has played with the robot 1, the meaningful information contains the data acquired of the user 2 in the past. For example, if the information shows that the user 2 has stroked the robot 1, it contains the numerical data showing the number of times the user 2 has stroked the robot 1.

The emotion/instinct modeling section 51, which will be described later in detail, determines the emotion the robot 2 shows to the user 2, such as "pleasure," "sadness," "anger," "joy" or the like, from the data acquired of the user 2 in the past and contained in the meaningful information. The data representing the emotion thus determined is supplied to the action-determining section 52. Therefore, the robot 1 can recognizes the user 2 and can take an action to the user 2 in accordance with the data representing how the user 2 treated the robot 1 in the past.

The emotion/instinct modeling section 51 manages an emotion model and an instinct model. The emotion model and the instinct model express the emotion and instinct of the robot 1, respectively.

The emotion model expresses various emotions, such as "pleasure," "sadness," "anger," "joy" and like, each in a value that ranges from 0 to 100. The emotion model changes the value of emotion in accordance with the meaningful information supplied from the sensor-input processing section 50, the time that has elapsed, and the like.

The instinct model expresses various kinds of instincts, such as "appetite," "desire for sleep," "desire for exercise" and like, each in a value that ranges from 0 to 100. The instinct model changes the value of instinct in accordance with the meaningful information supplied from the sensor-input processing section 50, the time that has elapsed, and the like.

The emotion/instinct modeling section 51 supplies the emotion model and the instinct model to the action-determining section 52. The emotion model and the instinct model, which change in value as indicated above, express the emotion and instinct that the robot 1 has at present.

The action-determining section 52 determines the action that the robot 1 should take next, from the meaningful information supplied from the sensor-input processing section 50, the emotion model and instinct model supplied from the emotion/instinct modeling section 51, the time that has elapsed, and other information. The data showing the next action thus determined is supplied, as an instruction, to the position-changing section 53. That is, the action-determining section 52 controls a limited automaton that can respond to any state to which the robot 1 may react. Namely, the section 52 manages an action model that defines the actions the robot 1 may perform.

The action-determining section 52 changes the state to which the automaton responds, in accordance with the meaningful information supplied from the sensor-input processing section 50, the values of the emotion and instinct models supplied from the emotion/instinct modeling section 51, the time that has elapsed, and other information. The section 52 determines the action the robot 1 should take in response to the state thus changed.

Figure 5:
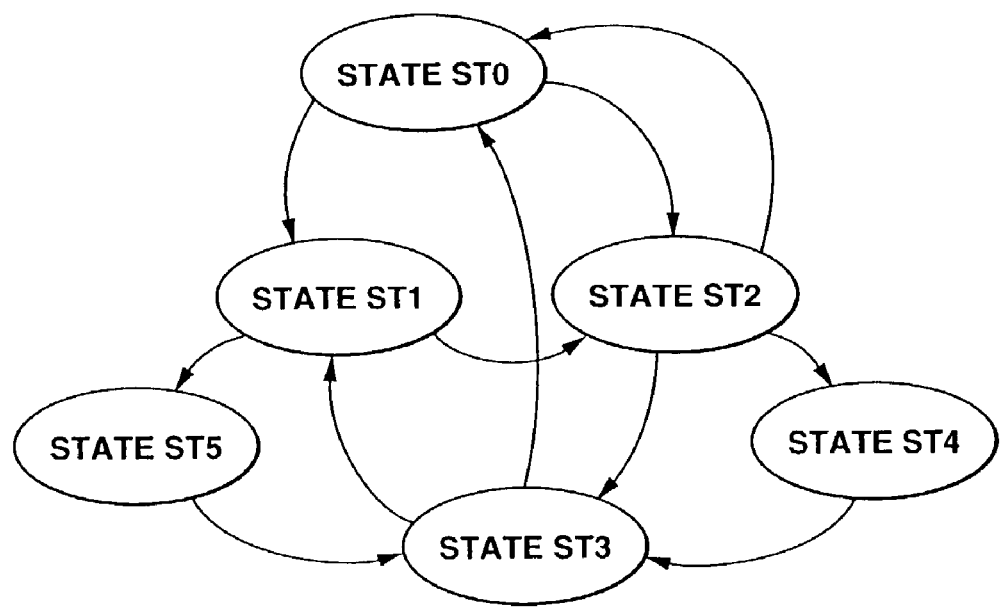
FIG. 5 is a diagram representing the action transition of the robot shown in FIG. 1.

As shown in FIG. 5, state ST3, state ST4 and state ST5 may represent "standing," "sleeping" and "running after a ball," respectively. Assume that the automaton is responding to state ST5, i.e., "running after a ball," and that action-determining section 52 receives from the sensor-input processing section 50 the meaningful information of "the ball has disappeared." Then, the section 52 transits the sate, from state ST5 to state ST3. In this case, the action-determining section 52 determines that the next action the robot 1 should take is "standing."

The action-determining section 52 may receive meaningful information "Stand!" while assuming the state ST4 of "sleeping." In this case, the section 52 transits the state, from state ST4 to state ST3 and determines that the next action the robot 1 should take is the action of "standing" which corresponds to state ST3.

The action-determining section 52 transits the state, from one to another, upon detecting a specific trigger. In other words, the section 52 transits the state when the time the robot 1 has been performing the action corresponding to the present state reaches a prescribed value, when the section 52 receives a particular meaningful information, when the emotion/instinct model supplied from the emotion/instinct modeling section 51 is equal to or less than, or equal to or more than, a preset value, or when a similar event takes places. As described above, the action-determining section 52 transits the state of the limited automaton of FIG. 5 in accordance with not only the meaningful information supplied from the sensor-input processing section 50, but also the values of the emotion and instinct models supplied from the emotion/instinct modeling section 51. The state may therefore be changed to various ones, depending on the values of the emotion and instinct models, even if the meaningful information input remains the same. As a result, the action-determining section 52 generates, for example, an action instruction of "Shake!" when the user 2 holds out the hand to the robot 1, if the emotion and the instinct models express "not angry" and "not hungry" and the meaningful information is "a hand stretched under the nose." The action instruction is supplied to the position-changing section 53.

The action-determining section 52 generates an action instruction to the position-changing section 53, causing the same to make the robot 1 lap the palm of the hand if the emotion and the instinct models express "not angry" and "not hungry" and if the meaningful information is "a hand stretched under the nose." This action instruction is supplied to the position-changing section 53.

Further, the action-determining section 52 generates an action instruction to the position-changing section 53, causing the same to make the robot 1 look away if the emotion model expresses "angry" and if the meaningful information is "a hand stretched under the nose," even if the instinct model expresses "hungry" or "not hungry." The action instruction generated is supplied to the position-changing section 53.

The action-determining section 52 can determine action parameters, such as the walking speed, speed and distance of moving the legs, and the like, from the emotion and instinct expressed by the emotion/instinct model supplied from the emotion/instinct modeling section 51. Action instructions including these parameters are supplied to the position-changing section 53.

The action-determining section 52 generates an action instruction in addition to the action instructions for causing the robot 1 to move the head and legs. This action instruction causes the robot 1 to utter speeches. The action instruction is supplied to the voice-synthesizing section 55. It contains the data representing the voice the voice-synthesizing section 55 should synthesize.

Upon receipt of the action instruction from the action-determining section 52, the voice-synthesizing section 55 generates a text data that corresponds to the information contained in the action instruction. The section 55 supplies the text data to the loudspeaker 29. The loudspeaker 29 generates a synthesized voice from the text data. Thus, the robot 1 therefore utters a speech.

The position-changing section 53 receives the action instruction from the action-determining section 52. In accordance with the action instruction the section 52 generates position change data to make the robot 1 change the position it take at present to a new position. The position change data is supplied to the control section 54. The new position is determined from the physical properties of the robot 1, such as the weight and the connection of body parts, and from the directions and angles in and by which actuators can rotate the joints.

The new position may be one that the robot 1 can takes immediately or another that the robot 1 cannot take at once. If the robot 1 sprawls on the floor, stretching out the legs, it can immediately take a sitting position, but cannot not take a standing position at once. The robot 1 needs to pull the legs toward the trunk first, before rising on its legs. That is, the robot 1 performs two actions in sequence.

The new position may be one that the robot 1 cannot immediately assume in safety. For example, the robot 1 standing on the four feet cannot raise the forelegs, without collapsing. To prevent the robot 1 from taking any dangerous position, the position-changing section 53 stores data items representing the positions that the robot 1 can take immediately. The section 53 supplies one of these data items to the control section 54 if the action instruction supplied from the action-determining section 52 designates a position that the robot 1 can assume at once. The action instruction may not designate a position that the robot 1 cannot take immediately. If so, the section 53 first supplies a data item representing a position the robot 1 can take at once to the control section 54 and then supplies the data item showing the desired new position to the control section 54 after the robot 1 assumes the position represented by the data item first supplied to the control section 54. Thus, the robot 1 will not take a dangerous position and will not collapse at all.

Figure 6:
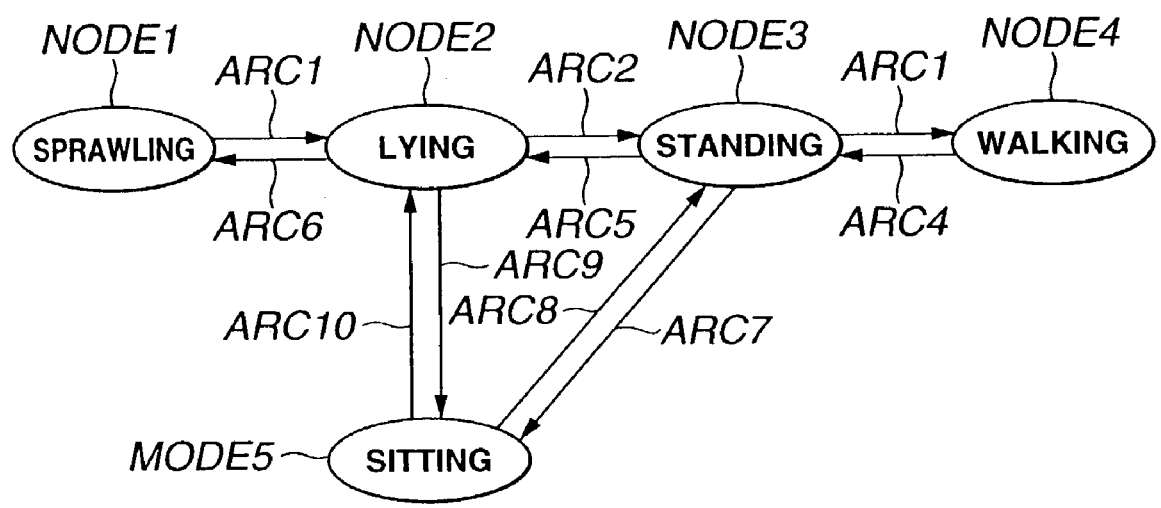
FIG. 6 is a diagram showing the position transition of the robot shown in FIG. 1.

More specifically, the position-changing section 53 stores an orientation chart illustrated in FIG. 6. As FIG. 6 shows, the orientation chart shows nodes 1 to 5 that correspond to various positions the robot 1 can assume. Upon receipt of an instruction from the action-determining section 52, the position-changing section 53 searches for an action route linking the node showing the action the robot 1 takes at present to any other node that indicates the action the robot 1 should take next. When the position-changing section 53 finds an action route, it generates data that represents the action route, or a sequence of the positions that the robot 1 should take one after another.

Assume that the robot 1 takes now is represented by the node 2 indicating a "lying position." When the position-changing section 53 receives an action instruction "sit!," it generates position change data designating the "sitting position" and supplies the data to the control section 54. This is because the robot 1 now taking the "lying position" (node 2) can immediately assume the "sitting position" (node 5).

Assume again that the robot 1 takes now is represented by the node 2 indicating a "lying position." When the position-changing section 53 receives an action instruction designating "walk!," it generates position change data designating the "walking position" and supplies this data to the control section 54. The section 53 searches for an action route that begins at the node 2 for "lying position" and ends at the node 4 for "walking position." Thus, the section 53 finds an action route consisting of the node 2 for "lying position," node 3 for "standing position" and node 4 for "walking position." In this case, the position-changing section 53 generates two position change instructions, one for "stand" and the other for "walk." These position change instructions are supplied to the control section 54.

The control section 54 generates control signals from the position change instructions supplied from the position-changing section 53. The control signals are supplied to the actuators. Controlled by these signals, the actuators drive the body parts of the robot 1, whereby the robot 2 makes a prescribed action.

FIGS. 7A and 7B depict the outer appearance of a portable terminal 3. More precisely, FIG. 7A shows the front of the portable terminal 3, which faces outwards while the terminal 3 remains on the user's wrist. On the other hand, FIG. 7B illustrates the back of the terminal 3, which contacts the wrist while the terminal 3 remains on the user's wrist.

As FIG. 7A shows, the terminal 3 comprises a case 71, display section 72, and operation buttons 73. The display 72 and the buttons 73 are arranged on the front of the case 71.

The display section 72 is, for example, an LCD (Liquid Crystal Display) or the like. The display section 72 can display various static data items and dynamic data items about the user 2, which the user 2 has input. The static data items are, for example, the name, age, birthday and blood type. The dynamic data items are, for example, the temperature and heartbeat rate. The display section 72 displays the time, too.

The operation buttons 73 are pushed by the user 2 to input the static data items and dynamic data items. When the user 2 pushes the buttons 73, numerals, letters and symbols are input.

Straps 74A and 74B are fastened to the upper and lower edges of the case 71. The user 2 may wrap the straps 74A and 74B around the wrist to wear the portable terminal 3.

As FIG. 7B shows, an electrode 75 is provided on the back of the case 71. The electrode 75 is made of electrically conductive material. While the user 2 is wearing the portable terminal 3 on the wrist, the electrode 75 remains in contact with the user 2 or remain electrically connected to the user 2 by virtue of capacitive coupling if a thin insulating film covers the electrode 75.

To enhance the data transfer efficiency via the human being, other electrodes 75 may be provided on the backs of the straps 74A and 74B, in addition to the electrode 75 provided on the back of the case 71.

Figure 8:
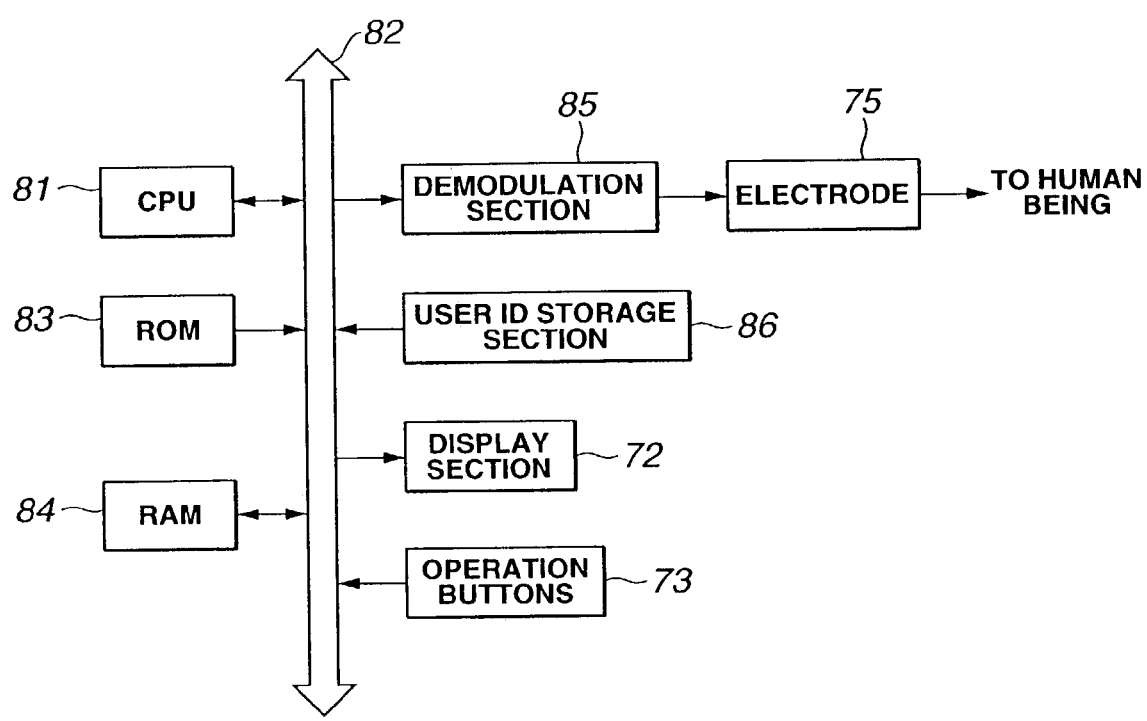
FIG. 8 is a block diagram showing the internal configuration of the portable terminal.

FIG. 8 is a block diagram showing the internal configuration of the portable terminal 3 (case 71). The components equivalent to those already described above are designated at the same reference numerals and will not be described in detail.

A CPU 81 controls the other components of the portable terminal 3. In the terminal 3, a bus 82 connects the processing sections to the CPU 81. The CPU 81 writes the control program stored in a ROM (Read Only Memory) 83 into a RAM (Random Access Memory) 84. The CPU 81 causes the processing sections to operate in accordance with the control program.

The modulating section 85 modulates signals to be transmitted to the robot 1, in a specific scheme such as FSK (Frequency Shift Keying). The signals thus modulated are transmitted from the electrode 75.

The user ID storage section 86 stores the user ID that has registered. The section 86 stores the information the user 2 has input by operating the operation buttons 73.

Data is transferred between the portable terminal 3 and the robot 1. More precisely, data is transferred between the electrode 75 of the terminal 3 and the electrode 15 provided on the robot 1 through the human being (i.e., user 2) as indicated above.

The characteristic of the data transfer via the human being will be explained. Jpn. Pat. Appln. Laid-Open Publication No. 7-170215 discloses the data transfer characteristic in detail.

The major component of the human being is water that contains salt. The human being can be regarded as an electrically conductive vessel if the carrier frequency is in the order of several megahertz (MHz). The DC resistance between the hands detected by, for example, a tester ranges from 500 KΩ to 2 MΩ or 3 MΩ, depending on the condition of the hands.

Figure 9A:
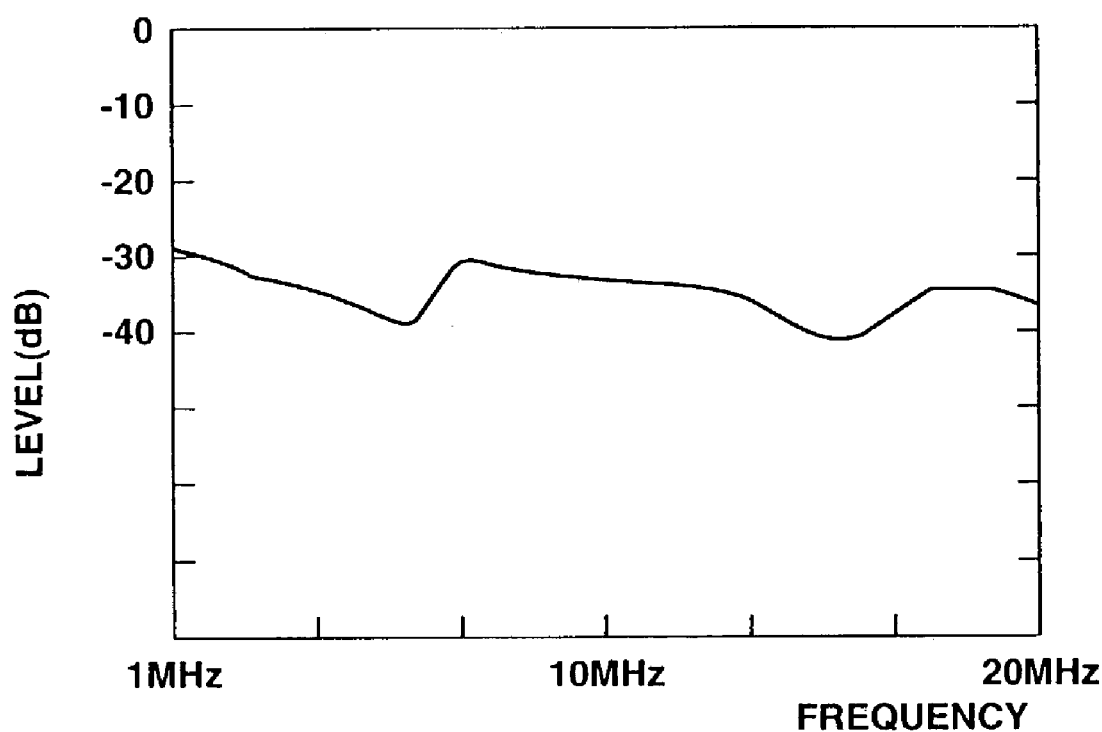
FIGS. 9A and 9B are graphs that represent transfer characteristics.
Figure 9B:
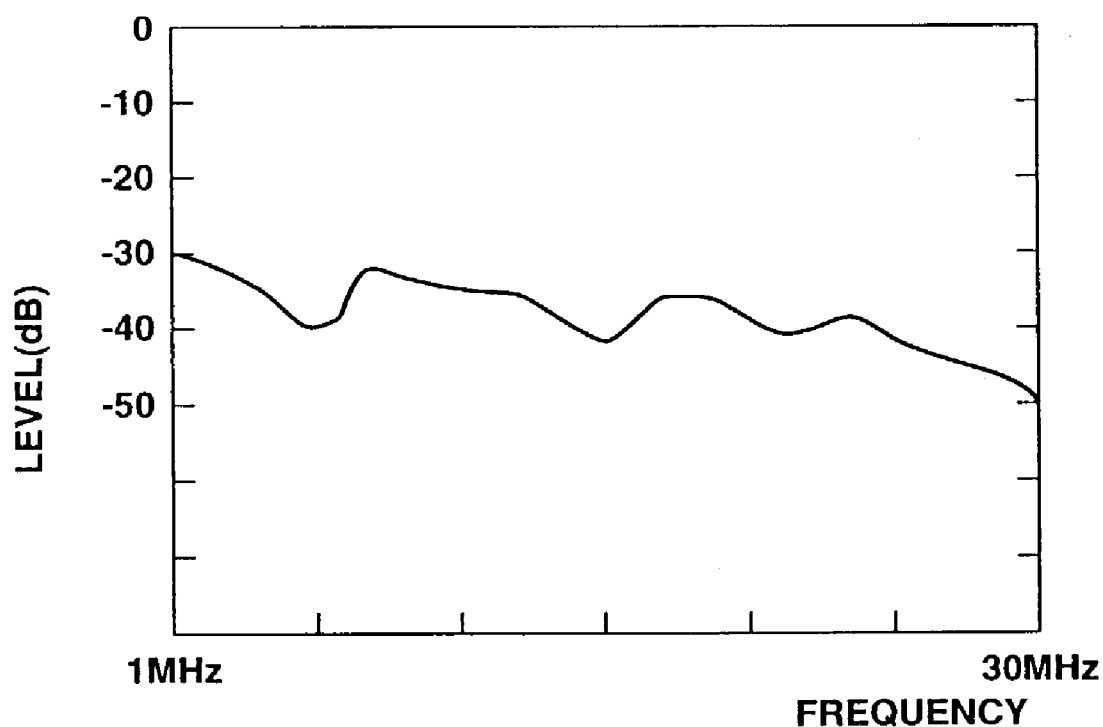

FIGS. 9A and 9B show the transfer characteristic that the human being exhibits to alternating currents. More correctly, FIG. 9A shows a transfer characteristic of the human being, determined by a spectrum analyzer over a frequency range of 1 MHz to 20 MHz. FIG. 9B shows a transfer characteristic of the human being, determined by the spectrum analyzer over a frequency range of 1 MHz to 30 MHz. Either transfer characteristic was determined in the case where a coaxial cable was connected to both the tracking generator and the input terminal. The ground terminals of the lines constituting the coaxial cable were connected to each other, thus preventing them from acting as an antenna.

As FIGS. 9A and 9B show, the transfer characteristic is almost constant in the frequency range of 1 MHz to 20 MHz. It is an attenuation ranging from 30 dB to 40 dB.

In the process of determining the transfer characteristics shown in FIGS. 9A and 9B, the output impedance of the tracking generator and the input impedance of the spectrum analyzer were set at 75Ω. Hence, the attenuation must be as much as −80 dB if the impedance between the hands is 1 MΩ. In fact, however, the attenuation was far smaller. This proves it possible to transmit signals through the human being.

The data-transmitting side is considered to be a tiny dipole antenna. The electromagnetic field emanating from the dipole antenna has been thoroughly analyzed. The results of the analysis show teach that the electromagnetic field the human being generates is transmitted from the tiny dipole antenna. The intensity of the electromagnetic field is expressed as a vector sum of three components that are inversely proportional to the distance R from the antenna, the square of distance R and the cube of distance R, respectively. The three components are called "radiant electromagnetic field," "inductive electromagnetic field" and "static electromagnetic field," respectively. The relation between these fields is disclosed in detail in Jpn. Pat. Appln. Laid-Open Publication No. 7-170215 mentioned above.

Figure 10A:
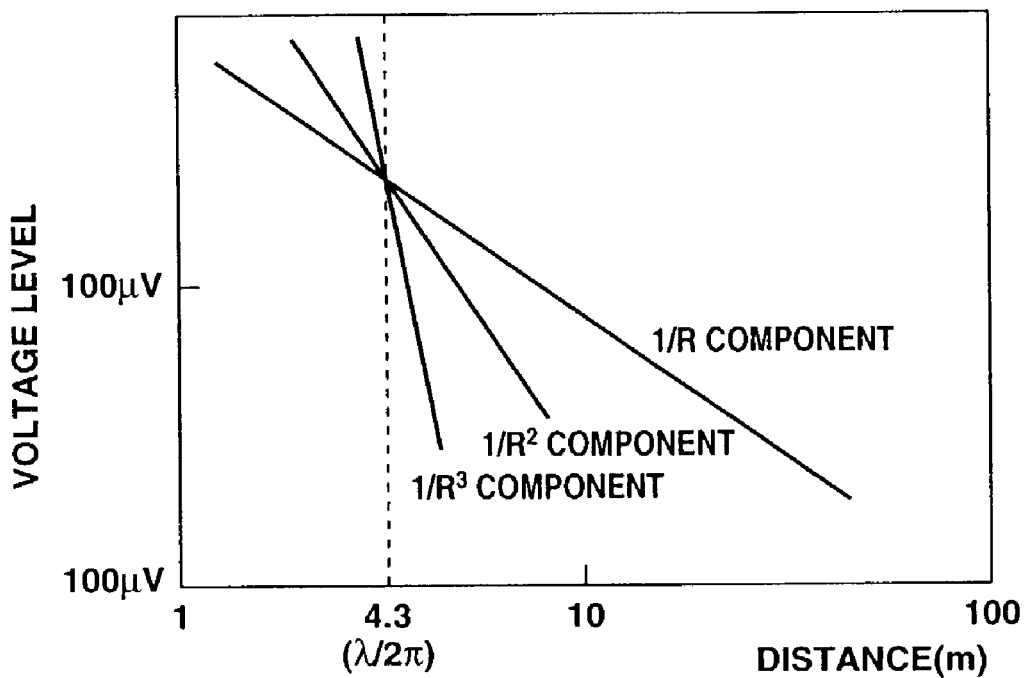
FIGS. 10A and 10B are other graphs representing transfer characteristics.
Figure 10B:
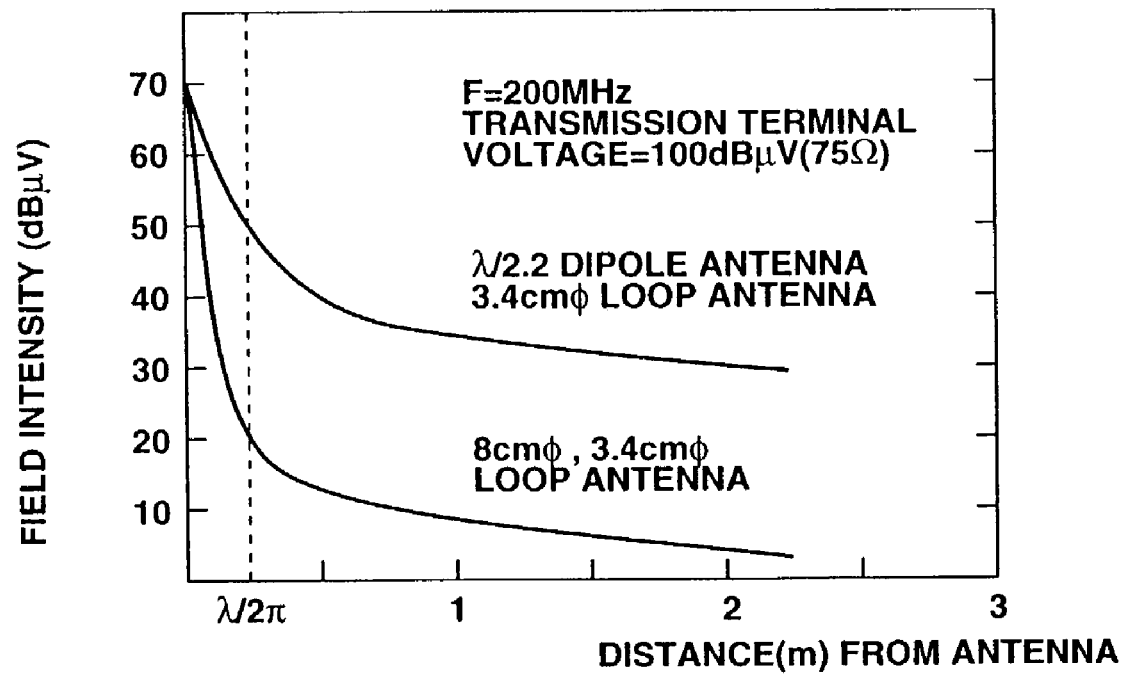

FIG. 10A is a graph representing the relation between the intensities of the electric fields for the distance R, the square of distance R and the cube of distance R, on the one hand, and the distance from the antenna, on the other. FIG. 10B is a graph illustrating the relation between the intensities of the electric fields emanating from a λ/2.2 dipole antenna, a 3.4 cmø loop antenna, an 8 cmø loop antenna and a 3.4 cmø loop antenna, on the one hand, and the distances from these antennas, which is observed when the transmission frequency is 200 MHz and the transmission terminal voltage is 100 dBµV (75Ω).

As FIG. 10A shows, the radiant electromagnetic field (the term of $1/R$), the inductive electromagnetic field (the term of $1/R^2$), and the static electromagnetic field ($1/R^3$) have the same intensity at the distance of $\lambda/2\pi$. If the distance is shorter than this, the intensities of the electromagnetic fields will greatly increase. If f=11 MHz, the distance is about 4.3 m. The user directly touches the robot 1. In view of this, it is desired that static magnetic fields be used in the robot-controlling system according to this invention.

The intensity of the electric field should better be fall within a range that is not limited by the regulations concerning EMI (Electromagnetic Inference). For example, it may be 500 µV/M or less at a frequency of 332 MHz or less. If so, data transfer between the portable terminal 3 and the robot 1 can be ensured.

Figure 11:
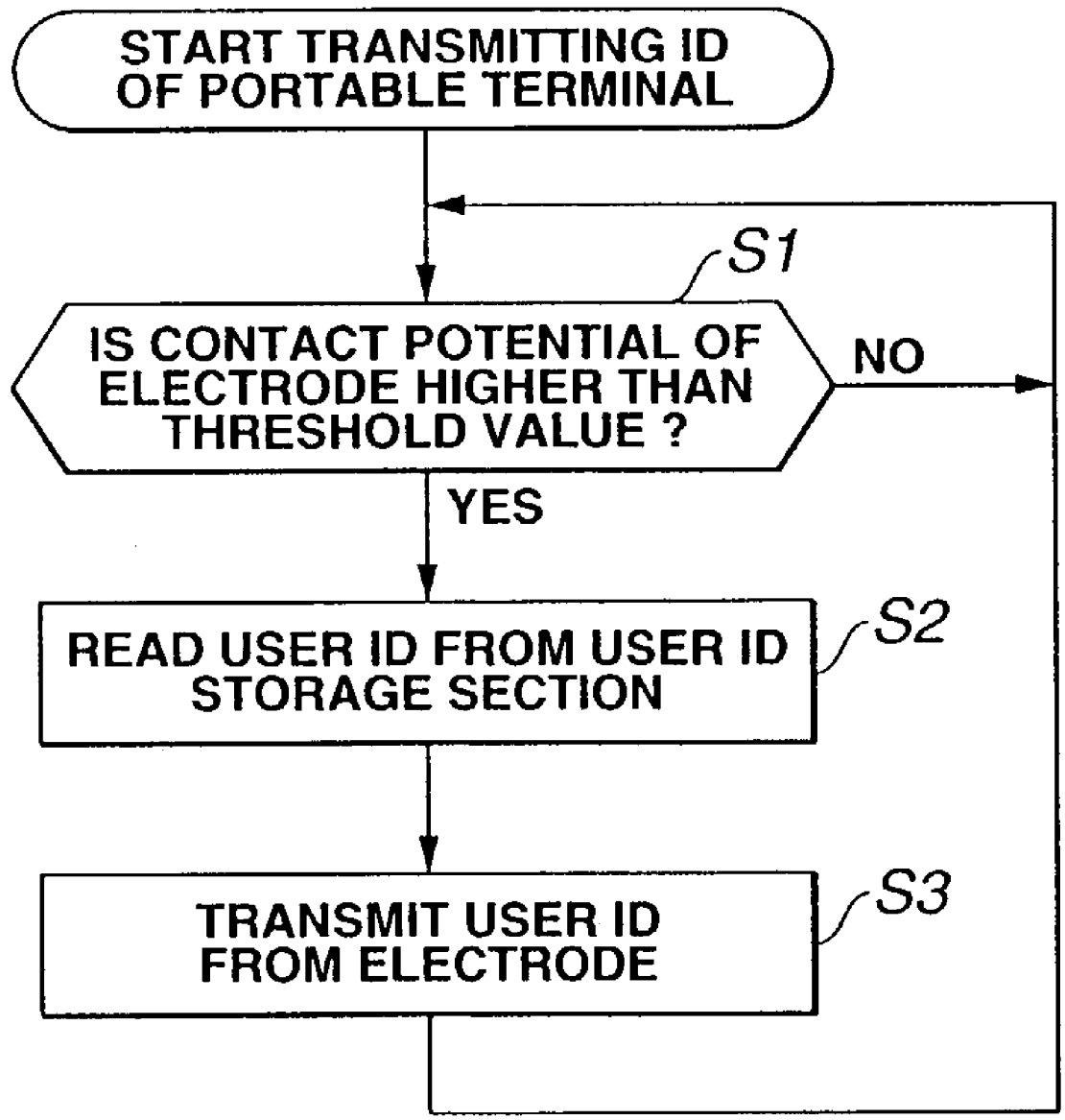
FIG. 11 is a flowchart explaining the process that the portable terminal performs.

How the robot 1 receives the user ID transmitted from the portable terminal 3 and acts in accordance with the user ID will be described. First, it will be explained how the portable terminal 3 transmits the user ID, with reference to the flowchart of FIG. 11.

At Step S1, the CPU 81 determines whether the potential at the electrode that contacts the human being is higher than a threshold value. That is, the CPU 81 determines whether it is possible to transfer data to the robot 1 via the user 2.

If the potential is not higher than the threshold value, or if it is impossible to achieve stable data transfer, the CPU 81 waits until the potential reaches the threshold value. When the potential reaches the threshold value, the process goes to Step S2.

At Step S2, the CPU 81 reads the user ID stored in the user ID storage section 86. The user ID may be specific to the portable terminal 3. If the user ID cannot be changed, however, the robot 1 will identify two or more persons who use the terminal 3 as the same person. In view of this, any user may operate the buttons 73 to input his or her own ID into the user ID storage section 86. Once the user IDs have been thus input, any user can selects his or her own ID, which will be transmitted from the electrode 75.

At Step S3, the CPU 81 causes the modulating section 85 to modulate the user ID read from the user ID storage section 86. The user ID modulated is transmitted from the electrode 75. Thereafter, the process returns to Step S1, whereby Steps S1 to S3 are repeated. Thus, the user ID is repeatedly transmitted from the terminal 3 as long as the potential at the electrode contacting the human being remains higher than a threshold value. The robot 1 can therefore verify the user ID repeatedly until it recognizes the user 2.

Figure 12:
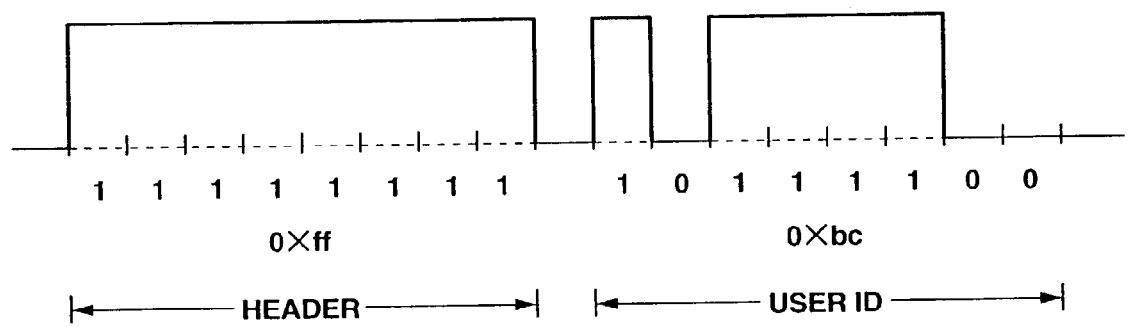
FIG. 12 is a diagram illustrating a data format.

The user ID is transmitted to the human being in, for example, the format shown FIG. 12.

As FIG. 12 shows, the data is composed of two data items, i.e., a header and user ID data. Both data items consist of eight bits each. The header is code 0×ff (11111111). The user ID is code 0×bc (10111100). The user ID should not be code 0×ff (11111111) or code 0×00 (00000000) so that it may not be confused with the header or may not be regarded as a communication pause. Consisting of eight bits, the user ID can have 254 different values.

Figure 13:
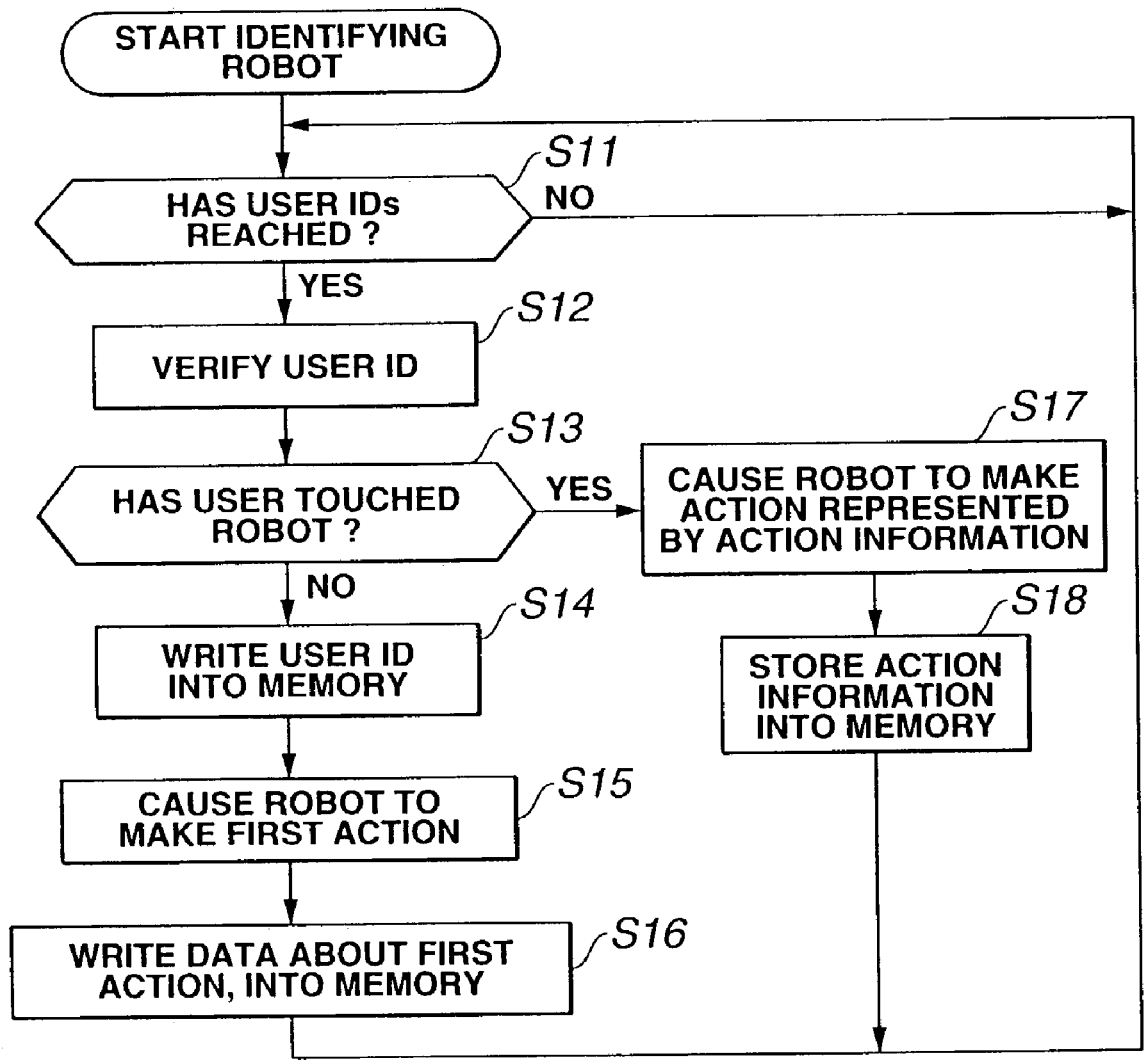
FIG. 13 is a flowchart explaining the process that the robot according to the invention performs.

How the robot 1 verifies the user ID will be described, with reference to the flowchart of FIG. 13.

At Step S11, the CPU 20A of the controller 20 determines whether the user ID transmitted from the portable terminal 3 has reached the demodulating section 28 via the human being (user 2) and the electrode 15 provided on the bead unit 13. If YES, the demodulating section 28 demodulates the user ID received at the electrode 15. The user ID demodulated is supplied to the CPU 20A.

The CPU 20A waits until it receives the user ID. Upon receipt of the user ID, the CPU 20A goes to Step S12.

At Step S12, the CPU 20A verifies the user ID it has received. That is, the CPU 20A searches the memory 20C to determine whether the memory 20C stores the user ID it has received.

At Step S13, the CPU 20A determines whether the user identified with the user ID at Step S12 has ever touched (or played with) the robot 1, from the information stored in the memory 20C.

If the CPU 20A determines that the user ID received is not registered (that is, if the user has not ever touched the robot 1), it goes to Step S14. The information showing that the user 2 touches the robot 1 for the first time is supplied, as meaningful information, to the emotion/instinct modeling section 51 and the action-determining section 52.

At Step S14, the CPU 20A writes the user ID into the memory 20C.

At Step S15, the CPU 20A causes the robot 1 to make the first reaction to the user 2. More specifically, the action-determining section 52 receives the meaningful information supplied from the sensor-input processing section 50 and indicating that the user 2 contacts the robot 1 for the first time. The section 52 then changes the state of the limited automaton described above, referring to the action transition chart of FIG. 5 and using the information supplied from the emotion/instinct modeling section 51 and indicating the emotion and instinct of the robot 1. Thus, the section 52 determines the action that the robot 1 should take next. When the user 2 touches the robot 1 for the first time, the action-determining section 52 may receives information showing that the emotion parameter (pleasure) and the instinct parameter (desire for exercise) are high. In this case, the section 52 supplies to the position-changing section 53 an action instruction for making the robot 1 act as if asking the user 2 to play with him, hesitatingly. When the user 2 touches the robot 1 for the first time, the action-determining section 52 may receives information showing that the emotion parameter (fear) is very high. In this case, the section 52 supplies to the position-changing section 53 an action instruction for making the robot 1 act as if start running away from the user 2.

The position-changing section 53 generates position change data from the action instruction and supplies the data to the control section 54. The control section 54 receives the position change data and drives the actuators in accordance with the position change data. The robot 1 therefore performs an action.

At Step S16, the CPU 20A writes the information about the action that the robot 1 took at Step S15, into the memory 20C, along with the user ID. Thus, the memory 20C stores action data that represents the robot 1 "asked the user 2 to play with him, hesitatingly" or "start running way from the user." When the user 2 touches the robot 1 for the second time, the information about this touch influences the decision the action-determining section 52 will make. Thereafter, the process returns to Step S11. Steps S11 and the following steps are repeated.

At Step S13, the CPU 20A may determine that the user has ever touched the robot 1, by finding that the user ID it receives has been registered. If this is the case, the CPU 20A goes to Step S17.

At Step S17, the CPU 20A reads the action information stored in the memory 20A in association with the user ID and causes the robot 1 to perform the action represented by the action information. The emotion/instinct modeling section 51 changes the emotion parameter and the instinct parameter on the basis of the information supplied from the sensor-input processing section 50 and indicating how the robot 1 acted to the user 2 in the past and what state the robot 1 assumes at present in terms of emotion and instinct. The parameters thus changed are supplied to the action-determining section 52. The section 52 changes the state of the limited automaton in accordance with the parameters it has received, thus determining the next action the robot 1 should take.

Assume that the sensor-input processing section 50 supplies the information showing that the user 2 "stroked" the robot 1 in the past, to the emotion/instinct modeling section 51. Then, the section 51 sets the emotion parameter at high "pleasure." The section 51 supplies, to the action-determining section 52, the emotion parameter thus set and the information showing that the instinct parameter (desire for exercise) is high at present. From the emotion parameter and this information the action-determining section 52 generates an action instruction to make the robot 1 to "run to the user 2, wagging the tail unit 14 as much as possible and run to the user 2." The action instruction is supplied to the position-changing section 53. The position-changing section 53 generates a position change data, which is supplied to the control section 54. The control section 54 drives the actuators, whereby the robot 1 acts in accordance with the action instruction.

At Step S18, the CPU 20A stores the information representing the action the robot 1 assumes to the user 1, into the memory 20C. The memory 20C accumulates the data items showing the actions the robot 1 took to the user 2, generating parameter information that represents the friendly behavior the robot 1 assumes to the user 2. Hence, when the user 2 touches the robot 1 again, the robot 1 will behave friendly to the user 2. The process returns to Step S11, and Steps S11 and the following steps will be repeated.

Figure 14:
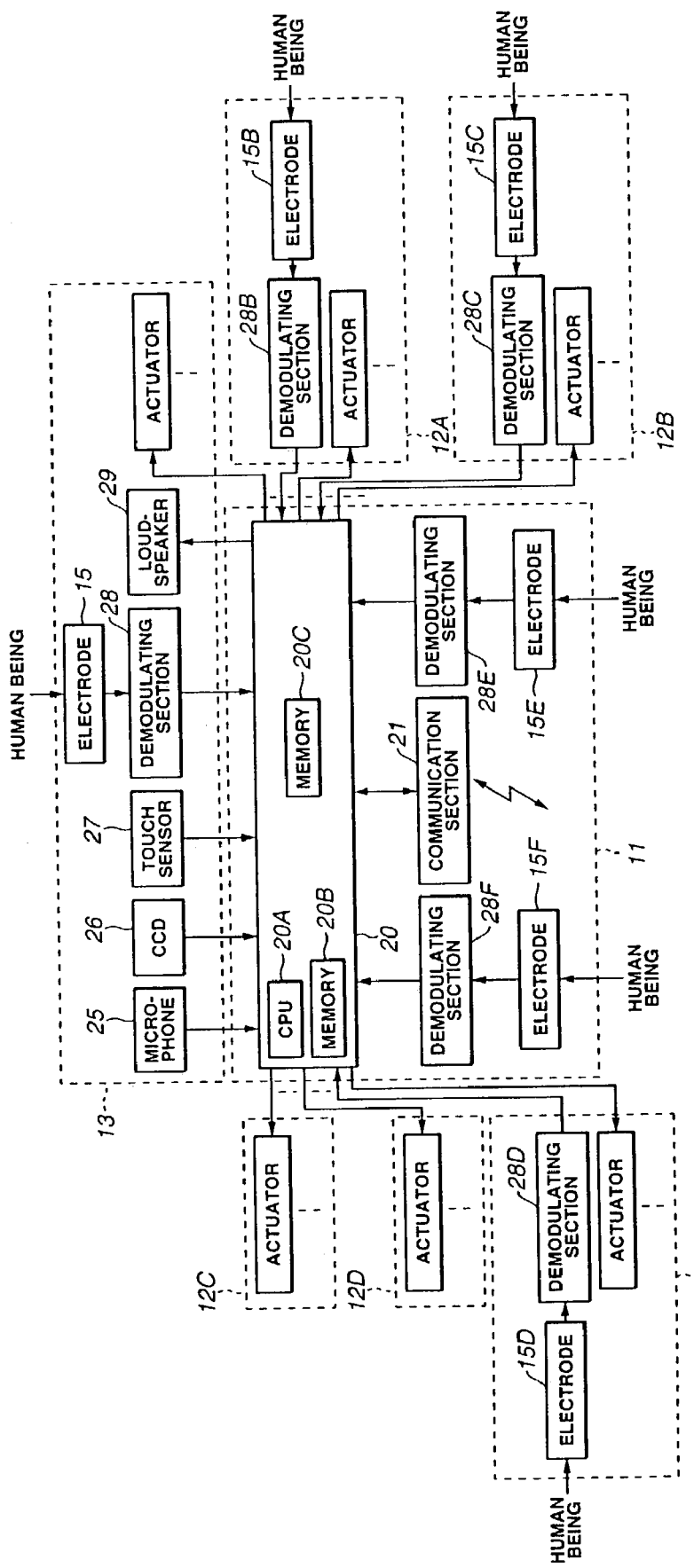
FIG. 14 is a block diagram showing the internal configuration of another robot according to this invention.

FIG. 14 is a block diagram showing the internal configuration of another robot 1.

This robot 1 has electrodes 15B, 15C and 15D in addition to the electrode 15 provided on the head unit 13, and demodulating sections 28B, 28C and 28D in addition to the demodulating section 28 provided in the head unit 13. The electrode 15B and the demodulating section 28B are provided on and in the leg unit 12A. The electrode 15C and the demodulating section 28C are provided on and in the leg unit 12B. The electrode 15D and the demodulating section 28D are provided on and in the tail unit 14. Hence, the CPU 20A can make the robot 1 perform more complicated actions, in accordance with the position of the electrode that receives the user ID and the information showing the action the user 2 who touches the electrode took in the past.

Assume that action information is stored, which shows that the user 2 keep holding the tail unit 14 for a long time. Then, the CPU 20A causes the robot 1 to act as if not allowing the user 2 to touch the tail unit 14, though allowing other users to touch the tail unit 14.

The robot 1 further has electrodes 15E and 15F and demodulating sections 28E and 28F. The electrode 15E and the demodulating section 28E are provided on and in the front part of the trunk unit 11. The electrode 15F and the demodulating section 28F are provided on and in the rear part of the trunk unit 11. Thus, a plurality of electrodes and a plurality of demodulating sections may be provided on and in the same unit.

In the robot-controlling system described above, the portable terminal 3 transmits only a user ID to the robot 1. Nevertheless, the terminal 3 may transmit various information items, as well as the user ID, to the robot 1, in order to control the robot 1.

For example, the portable terminal 3 may transmit the static data items about the user 2, such as name, sex, birthday and blood type, and the dynamic data items of the user, such as temperature and heartbeat rate. The user 2 can input the static data items by operating the buttons 73 provided on the portable terminal 3. The terminal 3 has various sensors that detect the dynamic data items.

Figure 15:
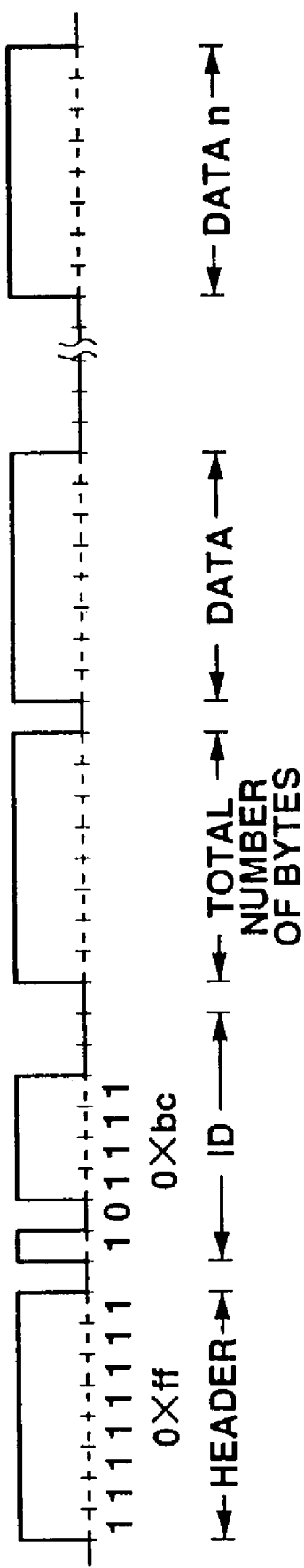
FIG. 15 is a diagram illustrating another data format.

FIG. 15 is a diagram illustrating the data format in which the data other than the user ID, for example the static and dynamic data items about the user, is transmitted from the portable terminal 3.

In the data format, there is describes the total amount of data (total number of bytes) that the terminal 3 transmits after the header and the user ID, both explained with reference to FIG. 12. Described next to the total amount of data is data items 1 to n, which are transmitted to the robot 1. The static data items including the birthday of the user 2 may be supplied from the electrode 15 to the CPU 20A. In this case, the CPU 20A refers to the present time presented by the clock incorporated in the controller 20 and determines whether it is the birthday today. If YES, the CPU 20A can cause the robot 1 to act as if celebrate the user's birthday.

From the electrode 15B the CPU 20A may receive, for example, the temperature data, which is a dynamic data item. If so, the CPU 20A compares the temperature data with the data stored in the memory 20C and representing the user's normal temperature. If the CPU 20A finds that the temperature is higher than the normal temperature, it can cause the robot 1 to act as if worrying about the user 2. In this case, too, the action of the robot 1 is influenced by the emotion parameter generated from the accumulated data that represents the actions the user 2 took to the robot 1 in the past.

As described above, the electrodes 15 and 15B to 15F provided on the robot 1 explained with reference to FIGS. 3 to 14 only receive data from outside. Nevertheless, these electrodes may transmit data to any conductive members that contact them. (Hereinafter, these electrodes shall be collectively referred to as "electrode 15" if they need not be distinguished from one another.) Then, the electrode 15 can transmit various requests to the portable terminal 3 that the user 2 touching the robot 1 wears. For instance, the electrode 15 can transmit a message to the user 2, requesting that the user 2 should talk to the robot 1.

To transmit data from the electrode 15 on the robot 1 to any conductive member that contacts the electrode 15, the demodulating section 28 and the demodulating sections 28B to 28F, all provided on the robot 1, must be replaced by modulating/demodulating sections that can modulate and demodulate data.

The data transmission between the robot 1 and the portable terminal 3 may be interactive data transmission accomplished by a full-duplex system. Alternatively, the data transmission may be achieved by a half-duplex system. In this case, data is transmitted in one direction, either from the robot 1 to the terminal 3 or from the terminal 3 to the robot 1.

Figure 16:
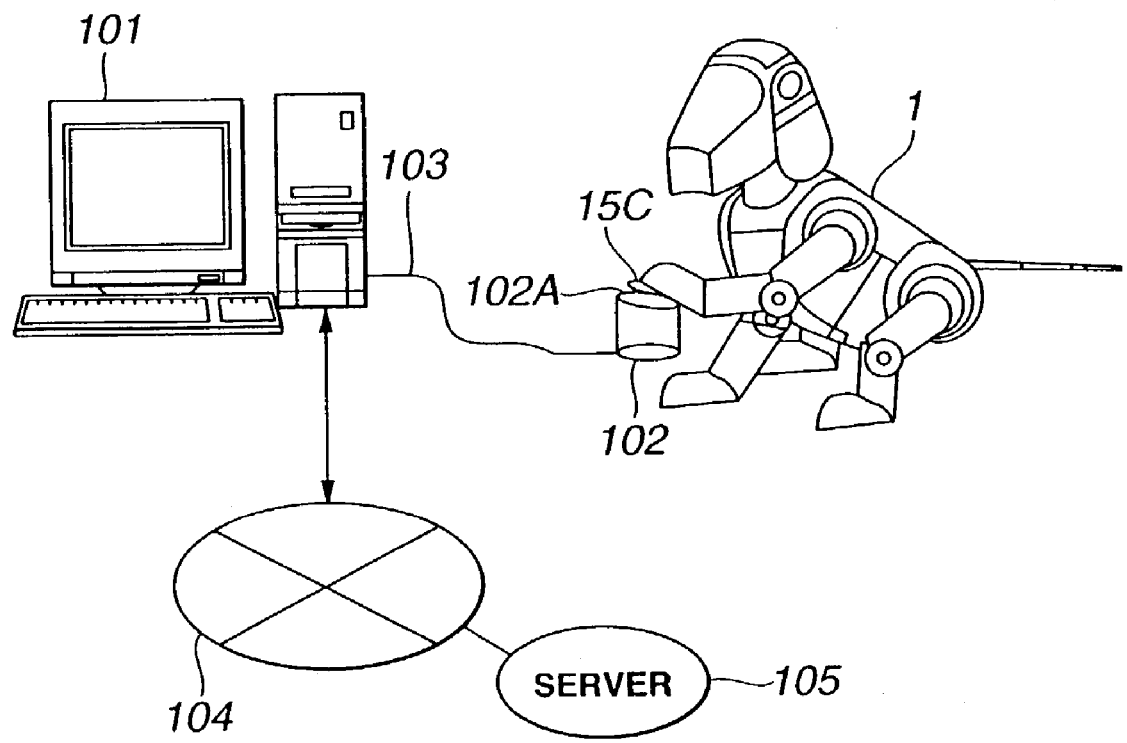
FIG. 16 shows the structure of another robot control system according to the present invention.

Since the robot 1 is designed as described above, such a system as is illustrated in FIG. 16 can be provided.

In this system, an electrode 15C is mounted on the distal end of the robot's leg unit 12B (FIG. 14). The system comprises a personal computer 101, a communication terminal 102, and a cable 103. The cable 103 connects the terminal 102 to the personal computer 101. The communication terminal 102 has an electrode 102A made of electrically conductive material.

The robot 1 moves the leg unit 12B, bringing the electrode 15C into contact with the electrode 102A of the communication terminal 102. Data communication can thereby carried out between the robot 1 and the personal computer 101. While the personal computer 101 remains connected to the Internet 104, the control program in the memory 20B of the controller 20 can be updated to the latest version by the control program supplied from a control program server 105 that is available in the Internet 104. The robot 1 can acquire a large amount of data from outside to have its characters greatly changed.

A plurality of communication terminals 102 may be arranged within an area in which the robot 1 may walk and move around. Each terminal can transmit to the robot 1 the data acquired at the position where the terminal is located. The data items transmitted from the communication terminals 102 represent the positions and environmental conditions of the terminals 102. These data items cause the robot 1 to perform various actions.

The user 2 may operate his or her portable terminal such as a PDA to input an E-mail. The E-mail is sent via the user 2 and stored into the memory 20C incorporated in the robot 1. Thus, the robot 1 can transmit the E-mail.

In this embodiment, the CPU 20A executes a program to carry out a sequence of processes. Nonetheless, hardware units may be provided to perform the processes, respectively.

The program may be stored not only in the memory 20B (FIG. 3), but also in a removable recording medium, either temporarily or permanently. Examples of the removable recording medium are a floppy disk, a CD-ROM (Compact Disk Read Only Memory), a magneto-optical disk, a DVD (Digital Versatile Disk), a magnetic disk, and a semiconductor memory. The removable recording medium is provided in the form of a so-called "package software," which can be installed into the robot 1 (more precisely, into the memory 20B).

The program may be installed into the memory 20B not only from a removable recording medium. But also it can be installed from a download site via a digital broadcasting satellite by radio or via a LAN (Local Area Network) or the Internet 104 (FIG. 16) by a cable.

If this is the case, the program can be easily installed into the memory 20B whenever it is updated to the latest version.

In the present invention, the process steps, described in the program that the CPU 20A executes, need not be performed in the time sequence described in the flowcharts. Rather, the steps may be effected in parallel or independently. For example, they can be carried out in a parallel process or in accordance with an object.

The program may be executed by either a single CPU, or the parts of the program may be executed by a plurality of CPUs.

The word "system" used herein means an apparatus that is composed of a plurality of devices.

INDUSTRIAL APPLICABILITY

In the present invention, the information that controls a pet robot is transmitted to the pet robot through a transfer medium and an electrode provided on the pet robot. Hence, the pet robot can identify the user.

The system according to this invention receives the control information transmitted from another system, acquires action information related to the control information received, and controls a robot in accordance with the action information acquired. The robot can therefore perform complex actions.

In the present invention, the robot can identify the user since it is controlled in accordance with action information. Thus, the robot can act in various ways in response to the action the user takes to the robot.

The invention claimed is:

1. An action control apparatus for controlling the actions of a pet robot, comprising:
an exposed electrically conductive electrode arranged for contact with at least a portion of a human being;
transmitting means for transmitting control data which controls the actions of the pet robot; and
transfer means for contacting the electrically conductive electrode of the pet robot through a transfer medium, thereby electrically transmitting the control data to the pet robot from the transmitting means,
wherein the transfer medium is the human being; and
wherein the control data includes identifying data which identifies the human being who contacts said conductive electrode.

2. An action control apparatus according to claim 1, which is located at a prescribed position within an area where the pet robot walks and move around, and in which the transmitting means transmits control data related to the position at which the action control apparatus is located.

3. An action control apparatus to claim 1, which is configured to be mounted on an arm of a human being.

4. An action control apparatus according to claim 1, further comprising input means for inputting the control data, memory means for storing the control data input from the input means, and display means for displaying the control data stored in the memory means.

5. An action control apparatus according to claim 1, wherein the control data includes dynamic data items and static data items concerning the human being.

6. An action control apparatus according to claim 1, further comprising receiving means for receiving predetermined information transmitted from the pet robot.

7. A method of controlling an action apparatus for controlling the actions of a pet robot, comprising:
a step of providing an exposed electrically conductive electrode on the pet robot arranged for contact with at least a portion of a human being;
a step of transmitting control data which controls the action of the pet robot; and
a step of contacting the electrically conductive electrode of the pet robot through a transfer medium, thereby transmitting the control data to the pet robot from the transmitting means,
wherein the transfer medium is the human being; and
wherein the control data includes identifying data which identifies the human being who contacts said conductive electrode.

8. A recording medium storing a computer-readable program for controlling an action control apparatus for controlling the actions of a pet robot, the robot including an exposed electrically conductive electrode on the pet robot arranged for contact with at least a portion of a human being, said program describing:
a step of transmitting control data which controls the action of the pet robot; and
a step of contacting an electrically conductive electrode of the pet robot through a transfer medium, thereby transmitting the control data to the pet robot from the transmitting means,
wherein the transfer medium is the human being; and
wherein the control data includes identifying data which identifies the human being who contacts said conductive electrode.

9. An autonomous pet robot comprising:
an exposed electrically conductive electrode arranged for contact with at least a portion of a human being;
receiving means for receiving control data from an external device;
action data acquiring means for acquiring action data corresponding to the control data received by the receiving means; and
action control means for controlling actions in accordance with the action data acquired by the action data acquiring means,
wherein the receiving means is connected to the exposed electrically conductive electrode permitting contact with the human being, and said receiving means is configured to receive the control data electrically transferred through the human being to the electronically conductive member; and
wherein the control data includes identifying data which identifies the human being who contacts said conductive electrode.

10. A pet robot according to claim 9, further comprising memory means for storing the action data which has been acquired by the action data acquiring means and which action control means uses to control the actions.

11. A pet robot according to claim 9, wherein a plurality of electrically conductive members of the type described are provided, and the action control means controls the actions in accordance with which electrically conductive member has received the control data.

12. A pet robot according to claim 9, further comprising detecting means for detecting a pressure that the human being applies to the electrically conductive member when contacting the member, and in which the action data acquiring means acquires action data corresponding to the pressure detected by the detecting means.

13. A pet robot according to claim 9, further comprising: communication means for communicating with a data processing apparatus connected to a network, by way of the electrically conductive member; program acquiring means for acquiring a control program for the action control means, from the network as the communication means performs communication; and updating means for updating the control program for the action control means.

14. A pet robot according to claim 9, which further comprises a data processing apparatus located at a prescribed position within an area where the pet robot walks and moves around the communication means for communicating with the data processing apparatus through the electrically conductive member, and in which the receiving means receives, from the data processing apparatus, control data corresponding to the position of the data processing apparatus.

15. A method of controlling an autonomous pet robot, comprising:
a step of providing an exposed electrically conductive electrode on the pet robot arranged for contact with at least a portion of a human being;
a step of receiving control data transmitted from an external device;
a step of acquiring action data corresponding to the control data received at the step of receiving control data;
and a step of controlling actions in accordance with the action data acquired in the step of acquiring action data,
wherein at the step of receiving control data, the control data is electrically transmitted through the human being and is received by an electrically conductive electrode; and
wherein the control data includes identifying data which identifies the human being who contacts said conductive electrode.

16. A recording medium recording a program for controlling an autonomous pet robot, said robot including an exposed electrically conductive electrode on the pet robot arranged for contact with at least a portion of a human being, said program describing:
a step of receiving control data transmitted from an external device;
a step of acquiring action data corresponding to the control data received at the step of receiving control data; and
a step of controlling actions in accordance with the action data acquired in the step of acquiring action data,
whereby, at the step of receiving control data, the control data electrically is transmitted through the human being and is received by an electrically conductive electrode at the step of receiving control data, the control data is received through an electrically conductive electrode member exposed for contact with the human being; and
wherein the control data includes identifying data which identifies the human being who contacts said conductive electrode.

17. A robot control system comprising an autonomous pet robot and an action control apparatus for controlling actions of the pet robot, wherein said action control apparatus comprises:
transmitting means for transmitting control data for controlling the pet robot; and
transfer means for contacting an electrically conductive member of the pet robot through a transfer medium, thereby transmitting the control data to the pet robot from the transmitting means,
wherein the transfer medium is a human being, and wherein said pet robot comprises:
an exposed electrically conductive electrode arranged for contact with at least a portion of a human being;
receiving means for receiving the control data transmitted from the action control apparatus;
action data acquiring means for acquiring action data corresponding to the control data received by the receiving means; and
action control means for controlling actions in accordance with the action data acquired by the action data acquiring means,
wherein the receiving means includes the exposed electrically conductive electrode permitting contact with said transfer medium and is configured to electrically receive the control data through the electrically conductive electrode; and
wherein the control data includes identifying data which identifies the human being who contacts said conductive electrode.

18. An action control system for controlling the actions of a pet robot, comprising:
an exposed electrically conductive electrode arranged for contact with at least a portion of a human being;
transmitting means, attachable to the human being, for electrically transmitting control data through the human being to control the actions of the pet robot; and
transfer means, arranged on the pet robot and including the electrically conductive electrode, for receiving the electrically transmitted control data from the human being, thereby transmitting the control data to the pet robot,
wherein the control data includes identifying data which identifies the human being who contacts said conductive electrode.

19. A method of controlling an action system for controlling the actions of a pet robot, comprising:
a step of providing an exposed electrically conductive electrode on the pet robot arranged for contact with at least a portion of a human being;
a step of electrically transmitting control data, which controls the action of the pet robot, through the human being from a transmitting means attachable to the human being; and
a step of contacting the electrically conductive electrode, thereby transmitting the control data to the pet robot,
wherein the control data includes identifying data which identities the human being who touches the conductive electrode.

20. A recording medium storing a computer-readable program for controlling an action control system for controlling the actions of a pet robot said robot including an exposed electrically conductive electrode arranged for contact with at least a portion of a human being, said program describing:
a step of electrically transmitting control data which controls the action of the pet robot, through the human being from a transmitting means attachable to the human being; and
a step of contacting an electrically conductive electrode, arranged on the pet robot thereby transmitting the control data to the pet robot, wherein the control data includes identifying data which identifies the human being who contacts said conductive electrode.

21. An action control apparatus for controlling the actions of a pet robot, comprising:

means for generating control data for controlling the actions of the pet robot; and means, operable to be directly coupled to a human being, for enabling the control data to be electrically transferred to an electrically conductive member of the pet robot through the human being, wherein the control data includes identifying data which identifies the human being who contacts said conductive electrode.

* * * * *